(12) United States Patent
Oisel et al.

(10) Patent No.: US 7,979,435 B2
(45) Date of Patent: Jul. 12, 2011

(54) METHOD OF GROUPING IMAGES FROM A VIDEO SEQUENCE

(75) Inventors: Lionel Oisel, Pleumeleuc (FR); Bertrand Chupeau, Rennes (FR); François Le Clerc, Rennes (FR)

(73) Assignee: Thomson Licensing, Boulogne, Billancourt (FR)

( * ) Notice: Subject to any disclaimer, the term of this patent is extended or adjusted under 35 U.S.C. 154(b) by 1611 days.

(21) Appl. No.: 10/528,636

(22) PCT Filed: Sep. 11, 2003

(86) PCT No.: PCT/FR03/50051
§ 371 (c)(1), (2), (4) Date: Mar. 22, 2005

(87) PCT Pub. No.: WO2004/029832
PCT Pub. Date: Apr. 8, 2004

(65) Prior Publication Data
US 2006/0106816 A1    May 18, 2006

(30) Foreign Application Priority Data
Sep. 27, 2002  (FR) .................................. 02 11952

(51) Int. Cl.
*G06F 7/00* (2006.01)

(52) U.S. Cl. ........................................ 707/737; 707/725
(58) Field of Classification Search ........... 707/1–104.1, 707/725, 737
See application file for complete search history.

(56) References Cited

U.S. PATENT DOCUMENTS

| | | | |
|---|---|---|---|
| 5,572,246 A * | 11/1996 | Ellis et al. | 725/22 |
| 5,706,503 A | 1/1998 | Poppen et al. | |
| 5,821,945 A * | 10/1998 | Yeo et al. | 345/440 |
| 6,185,314 B1 * | 2/2001 | Crabtree et al. | 382/103 |
| 6,549,660 B1 * | 4/2003 | Lipson et al. | 382/224 |
| 7,054,367 B2 * | 5/2006 | Oguz et al. | 375/240.23 |
| 7,212,201 B1 * | 5/2007 | Geiger et al. | 345/420 |
| 2002/0028021 A1 * | 3/2002 | Foote et al. | 382/224 |
| 2002/0069218 A1 * | 6/2002 | Sull et al. | 707/501.1 |

OTHER PUBLICATIONS

M. Yeung et al. "Segmentation of Video by Clustering and Graph Analysis", Computer Vision and Image Understanding Academic Press, US, vol. 71, No. 1, Jul. 1, 1998, pp. 94-109.
Rui Yong et al.: "Exploring video structure beyond the shots", Multimedia Computing and System, 1998, Proceedings. IEEE International Conference on Austin, TX, USA Jun. 28 through Jul. 1, 1998, Los Alamitos, CA, pp. 237-240.
A. Sarkar et al. "A Simple Unsupervised MRF Model Based Image Segmentation Approach", IEEE Transactions on Image Processing, IEEE Inc., New York, US, vol. 9, No. 5, May 2000, pp. 801-812.
Search Report Dated Apr. 15, 2004, 3 pages.

* cited by examiner

*Primary Examiner* — James Trujillo
*Assistant Examiner* — Linh Black
(74) *Attorney, Agent, or Firm* — Robert D. Shedd; Joseph J. Opalach

(57) ABSTRACT

The method utilizing a graph-like structure is comprises the following iteration:
  calculation of the potential of node $n_m$, merging of two nodes $n_i$ and $n_j$, as a function of the distances between the attributes of the key images and as a function of the temporal distance of these key images,
  calculation of the potential of each edge connecting the merged node to another node of the graph previously connected to nodes $n_i$ or $n_j$,
  merging of the two nodes and validation of the new graph if the energy of this graph is less than the energy of the graph before merging.

6 Claims, 2 Drawing Sheets

METHOD OF GROUPING IMAGES FROM A VIDEO SEQUENCE

This application claims the benefit, under 35 U.S.C. §365 of International Application PCT/FR03/50051, filed Sep. 11, 2003, which was published in accordance with PCT Article 21(2) on Apr. 8, 2004 in French and which claims the benefit of French patent application No. 0211952, filed Sep. 27, 2002.

BACKGROUND OF THE INVENTION

The invention relates to a method and a device for clustering key images by using spatial-temporal attributes.

Clustering is aimed at grouping data by utilizing measurements of distances or similarities between them, data that are not very distant being clustered within one and the same class. An application pertaining to digital video data relates to the automatic construction of video summaries.

FIG. 1 represents a general scheme of a method of constructing a video summary of an image sequence.

In a first step 1, the video sequence is chopped into video shots. A second step 2 extracts characteristic images or key images from the various shots of the sequence. For each key image, this is step 3, a signature is calculated, for example on the basis of attributes of the image such as colour, structure, etc. The next step 4 is aimed at clustering the various shots which resemble one another into clusters of shots. A measurement of similarity is thus performed, on the basis of any calculation of distances between the signatures of the key images associated with each shot. The next step 5 constructs the summary by extracting a key image per cluster of shots.

This method makes it possible to reduce the number of characteristic shots, for example during video sequences with alternating shots, so as to create video summaries, indices, etc.

A known approach tackling the problems of clustering of shots for the construction of video summaries is that proposed by Yeung and Yeo in the document "Segmentation of video by clustering and graph analysis", Computer Vision and Image Understanding, vol 71, no 1, July, pp 94-109, 1998. With each pair of shots is associated a distance which is a measure regarding the differences between signatures. In addition to the distance between signatures, the procedure proposed contrives not to gather together shots whose temporal distance is greater than a temporal threshold T. The underlying idea rests upon the assumption that shots belonging to one and the same semantic unit cannot be very distant. This assumption also has the advantage of limiting the number of potential clusterings and thus of limiting the calculation cost. The clustering algorithm used operates on successive clusterings of shots commencing with the most similar until the distances are all greater than a threshold.

In this procedure, if two shots are separated by more than T images, the clustering is not possible. In the article cited, T is fixed at a value of the order of a few thousand images. The main problem of this procedure resides in the fact that this threshold is fixed, that it is of significant importance to the final result and that it is therefore difficult to fix a priori. For example, if a dialogue scene lasts more than 3000 images and if this value exceeds the temporal threshold, overchopping occurs. All the shots thus clustered must be pairwise close both visually and temporally. The size of the clusters thus generated is therefore relatively limited. The final result of this clustering algorithm is characterized by the obtaining of clusters that are relatively uniform in terms of number of shots, this number generally being small and in any event limited by the value of the threshold T.

SUMMARY OF THE INVENTION

The invention is aimed at alleviating the aforesaid drawbacks. Its subject is a method of clustering images of a video sequence consisting of shots and represented by a graph-like structure, a node of the graph representing a shot or a class of shots defined by key images and the nodes being connected by edges, characterized in that it comprises the following iteration:

selection of an edge $a_k$ connecting nodes $n_i$ and $n_j$ calculation of the potential of node $n_m$) merging of the two nodes $n_i$ and $n_j$, as a function of the distances between the attributes of the key images defining the class of shots of node $n_i$ and those of the key images defining the class of shots of node $n_j$ and as a function of the temporal distance of these key images, calculation of the potential of each edge connecting the merged node $n_m$ to another node of the graph previously connected to nodes $n_i$ or $n_j$, as a function of the distances between the attributes of the key images defining the class of shots of the merged node and those of the key images defining the class of shots of the other node and as a function of the temporal distance between these key images, the new class of shots associated with the merged node comprising the key images of the classes of shots of the merged nodes, merging of the two nodes and validation of the new graph if the energy of this graph, which is the sum of the potentials of the nodes and of the edges, is less than the energy of the graph before merging.

According to a particular implementation of the invention, the graph is initialized by assigning a node to each shot and by creating edges from one node to another node if the shots relating to these nodes are separated by a predetermined maximum number T of shots.

According to a particular implementation of the invention, the value of potential associated with the edges and with the nodes is a respectively decreasing and increasing function of temporal distance.

The calculation of similarity of the images takes into account the distance between signatures, for example the difference between histograms, and the temporal distance between key images defining the shots. This temporal constraint is adaptive, two shots that are initially too far apart to be clustered possibly then becoming potentially "clusterable" should intermediate shots be merged.

The calculation algorithm is based on energy minimization by merging relying on a graph structure. Contrary to the previous procedure, in order to belong to a cluster of images, also subsequently referred to as a class of images or class of shots, a candidate image must be visually and temporally close to at least one image of the cluster.

An advantage of the invention is the taking into account of images even if they are temporally far apart, due to merging, while favouring the clustering of temporally close images.

Another advantage resides in the fact that only one image of a cluster has to be similar to the candidate image in order to permit the merge. The clusters thus created can comprise more elements than in the case of the conventional procedure. The scheme proposed makes it possible to generate more heterogeneous clusters, that are less dependent on values of thresholds and hence closer to the data, without thereby rendering the calculations too complex or too lengthy.

BRIEF DESCRIPTION OF THE DRAWINGS

Other features and advantages of the invention will become clearly apparent in the following description given by way of nonlimiting example and offered in conjunction with the appended figures which represent.

DESCRIPTION OF PREFERRED EMBODIMENTS

The procedure proposed relies on a graph structure. A graph consists of a set of nodes and edges. A node $n_i$ symbolizes a shot or cluster of video shots that are similar according to the visual and temporal distance chosen, each shot $P_i$ being represented by at least one key image. The edges connect the nodes together, two nodes that are not connected by an edge not being potentially mergeable.

A size of temporal window T is chosen. It is given as a maximum number of shots T separating two shots in the video sequence. Upon the initialization of the graph, edges are created on the basis of a given node corresponding to a given shot towards each of the nodes whose shots lie in the temporal window of this given shot.

In a practical manner, the nodes are first connected by edges according to the sequential unfurling of the video sequence. This progression is subsequently taken into account, when adding the complementary edges, for the application of the temporal window. Then, the integer value T chosen for this step of initializing the graph signifies that only the nodes separated at most by T nodes from the node considered are taken into account for the calculation of the initial edges starting from this node. An initial edge $a_{ij}$ is created between node $n_i$ and node $n_j$ only if the temporal distance $d_T$ separating these nodes with which the shots $P_i$ and $P_j$ are associated is less than a threshold T. This constraint is effective only on initialization of the graph, the later mergings of nodes making it possible to connect nodes that are much further away from the origin, if necessary.

The choice of this threshold on initialization is made with the aim of optimizing the calculation time that is highly dependent on the number of edges.

Figure 1:
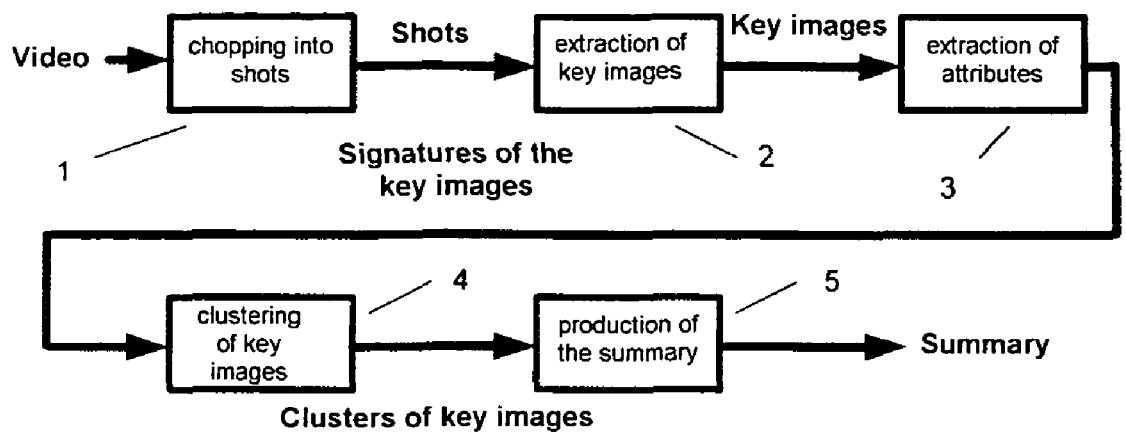
FIG. 1, a general scheme of the construction of video summaries.
Figure 2A:
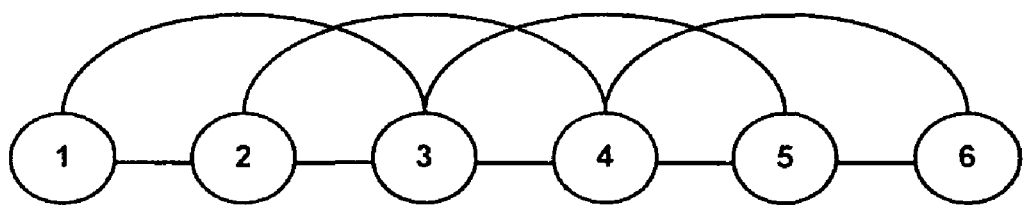
FIG. 2a, an exemplary initial graph.
Figure 2B:
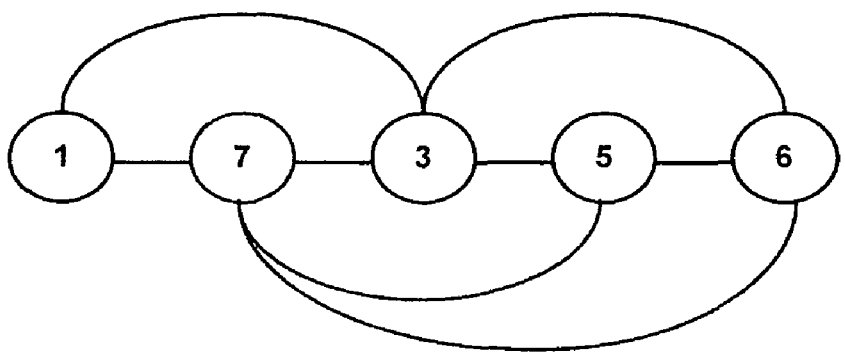
FIG. 2b, the result of this graph after an iteration.

The initialization of the graph is performed by creating a node per video shot. FIG. 2a represents an initial graph consisting of a set of 6 video shots symbolized by the nodes 1 to 6. In the example of FIG. 2a, by way of simplified illustration, the temporal threshold or temporal window on initialization is fixed at T=1. The threshold is in reality chosen equal to 6 in our implementation. In the example therefore, the edges are created between a node and the nodes separated from this node by one shot at most. FIG. 2b, which corresponds to the merging of nodes 2 and 4 to give node 7 shows however that, right from the first iteration, nodes 6 and 7, connected by edges, are outside the temporal window.

The energy of the system is equal to the sum of the potentials of the edges and of the nodes. The aim is to cluster or merge the nodes in such a way as to reduce the overall energy of the system.

To define the overall energy of the system, the concept of potential $V_n$ of a node and $V_a$ of an edge is introduced. A potential is calculated with the help of a base distance between two images $I_i$ and $I_j$, temporal distance and distance between attributes.

The value of the potential associated with an edge $a_{ij}$ is defined with the aid of a decreasing function of distance. The bigger the temporal distances and the distances between attributes, the smaller the potential. The overall objective of the algorithm being to minimize the overall energy of the system, the closer according to the distances defined above are the shots tied to two nodes, the higher will be the potentials of the edges and the more favoured will be the merging and hence the elimination of the edges.

The value of the potential associated with node $n_k$ is defined with the help of an increasing function of distance. The smaller the temporal distances or the distances between attributes as calculated between the images belonging to two distinct nodes, the smaller the potential associated with the merge node, hence the more the system will be inclined to merge the two nodes to create a node of small potential.

Let $V_a(n_i, n_j)$ and $V_n(n_m)$ be respectively the potentials of an edge connecting nodes $n_i$ and $n_j$ and of a node $n_m$.

Firstly we describe the potential related to the edges. Here we calculate the "inter-image" potentials of the edge for each of the pairs formed of an image from among the images associated with an end node of the edge and an image from among the images associated with another end node of the edge. Stated otherwise, we are dealing with potentials calculated on the basis of the cross distances between the images associated with the first node and those associated with the second node at the ends of the edge.

The potential $V_a(n_i, n_j)$ of an edge may therefore be written as a function of the cross distances between the images $I_k$ belonging to $n_i$ and the images $I_l$ belonging to $n_j$. The following minimum value is calculated:

$$V_a(n_i, n_j) = \min_{I_k \in P_i, I_l \in P_j} \left( w_{att} \cdot F_a(K_{att}, \tilde{d}_{att}, d_{att}(I_k, I_l)) + w_T \cdot F_a(K_T, \tilde{d}_T, d_T(I_k, I_l)) \right)$$

where:

$P_m$ represents the set of images that is associated with node $n_m$ $F_a$ is a decreasing function $w_{att}$ and $w_T$ represent the weights related to attributes and to time (in our implementation, $w_{att}=3$ and $W_T=1$)

$d_{att}(I_k, I_l)$ is the distance function associated with the characteristic attributes of the two images $\tilde{d}_{att}$ represents the mean of the distances between images calculated on the initial graph $d_T(I_k, I_l)$ is the temporal distance separating the two images $\tilde{d}_T$ is equal to T which represents the temporal threshold $K_{att}$ and $K_T$ are two constants.

The set of images that is associated with node $n_m$ is also referred to as the class of shots associated with node $n_m$. This class clusters together the set of images of the classes of merged shots.

The distance between attributes may be taken as a classwise difference between histograms characterizing each image. The temporal distance is for its part defined as the number of shots separating the two shots to which the images $I_k$ and $I_l$ belong.

In the implementation, the decreasing function $F_a$ is of the following form:

$$F_a(K, \tilde{d}, d) = \frac{1}{1 + e^{\frac{K}{\tilde{d}}(d-\tilde{d})}}$$

Values of potential are also calculated for the nodes of the graph. When two nodes $n_i$ and $n_j$ corresponding to key images $I_i$ and $I_j$ belonging respectively to the classes of shot $P_i$ and $P_j$ are merged to create a new node $n_k$, the images $I_i$ and $I_j$ are integrated into the new class of shots $P_k$ associated with node $n_k$. The number of associated images thus increases in tandem with the mergings. In a general manner, the number of images associated with a new node corresponds to the sum of the images associated with the merged nodes generating the new node.

The potential of a node merged from a first and second node is obtained with the help of the potentials calculated over the set of image pairs formed of an image associated with the first node and of an image associated with the second node. This value is dependent on the distance between attributes $d_{att}$ and on the temporal distance $d_T$. There are as many potentials calculated as there are image pairs. The value chosen is that which gives the minimum potential.

The potential $V_n(nm)$ of a node arising from the merging of two existing nodes $n_i$ and $n_j$ is therefore defined by the following function:

$$V_n(n_m = n_i \cup n_j) = \min_{I_k \in P_i, I_l \in P_j} \left( w_{att} \cdot F_n(K_{att}, \tilde{d}_{att}, d_{att}(I_k, I_l)) + w_T \cdot F_n(K_T, \tilde{d}_T, d_T(I_k, I_l)) \right)$$

The potential of a merge node is therefore calculated on the basis of the cross distances between the images belonging to each of the nodes that are candidates for the merge.

In the implementation, the increasing function $F_n$ is of the following form:

$$F_n(K, \tilde{d}, d) = 1 - \frac{1}{1 + e^{\frac{K}{\tilde{d}}(d-\tilde{d})}} = 1 - F_a(K, \tilde{d}, d)$$

On initializing the graph, the potential of the nodes is zero. There is a key image per node. It is in the course of the merging process that this potential takes a strictly positive value.

The factor K used in the functions $F_a$ and $F_n$ is a parameter which influences the curvature of the function. The bigger is K, the more the function tends to 0 or to 1 rapidly when moving away from the mean value $\tilde{d}$. In terms of potential, the bigger is K, the more the variations in d around the mean value give rise to big variations in the potential.

In the case of the function tied to the distance between attributes, $K_{att}$ may be taken equal to 2. In the case of the function tied to the temporal distance, $K_T$ may be taken equal to 7.

When calculating a potential relating to an image pair $(I_i, I_j)$, the further apart temporally or according to their attributes are the images processed, the lower is the potential of the edge corresponding to these two images, the greater is the potential of the node corresponding to the merged pair of images.

The temporal constraint therefore appears in two forms in our algorithm:
  by the existence or not of an edge between two nodes, this existence initially being related to the temporal distance separating two shots
  by the influence of the temporal distance separating two images on the value of the potential associated with the edges or with the nodes.

The overall energy of the system is equal to the sum of the potentials associated with each edge and with each node.

An iterative merging process is implemented to obtain a configuration of the system having the lowest possible overall energy. The aim of each iteration is to decrease the overall energy. The calculation of the minimum energy would require all possible combinations to be tried. This number possibly being appreciable, as a function of the number of shots, the energy minimization scheme chosen is a suboptimal scheme. It does not guarantee that the solution found does correspond to the configuration minimizing the total energy of the system. However, it has the benefit of being fast while providing an acceptable energy solution.

The smaller the distance between two images, the larger the potential of the edge relating to these two images and hence the higher the potential of the edge connecting the corresponding nodes. One seeks to reduce the overall energy of the system, hence to eliminate the edges of largest potential, this amounting to eliminating the potential relating to these edges, the potentials of the edges emanating from the merged nodes being recalculated. This corresponds well to wishing to cluster the closest images, both from the attributes point of view and from the temporal point of view.

The potential of a node obtained after merging the two nodes at the ends of the deleted edge is recalculated. The greater the distances between the images associated with the nodes to be merged, the bigger the potentials of the merged node that relate to the image pairs, the bigger the potential of this node which is the minimum value out of these potentials.

In the example of FIG. 2b, nodes 2 and 4 are merged to give node 7. The key images of nodes 2 and 4 are therefore now associated with node 7. The potential of node 7 is calculated as are the potentials of the new edges departing from this node, thus defining the new configuration.

Figure 3:
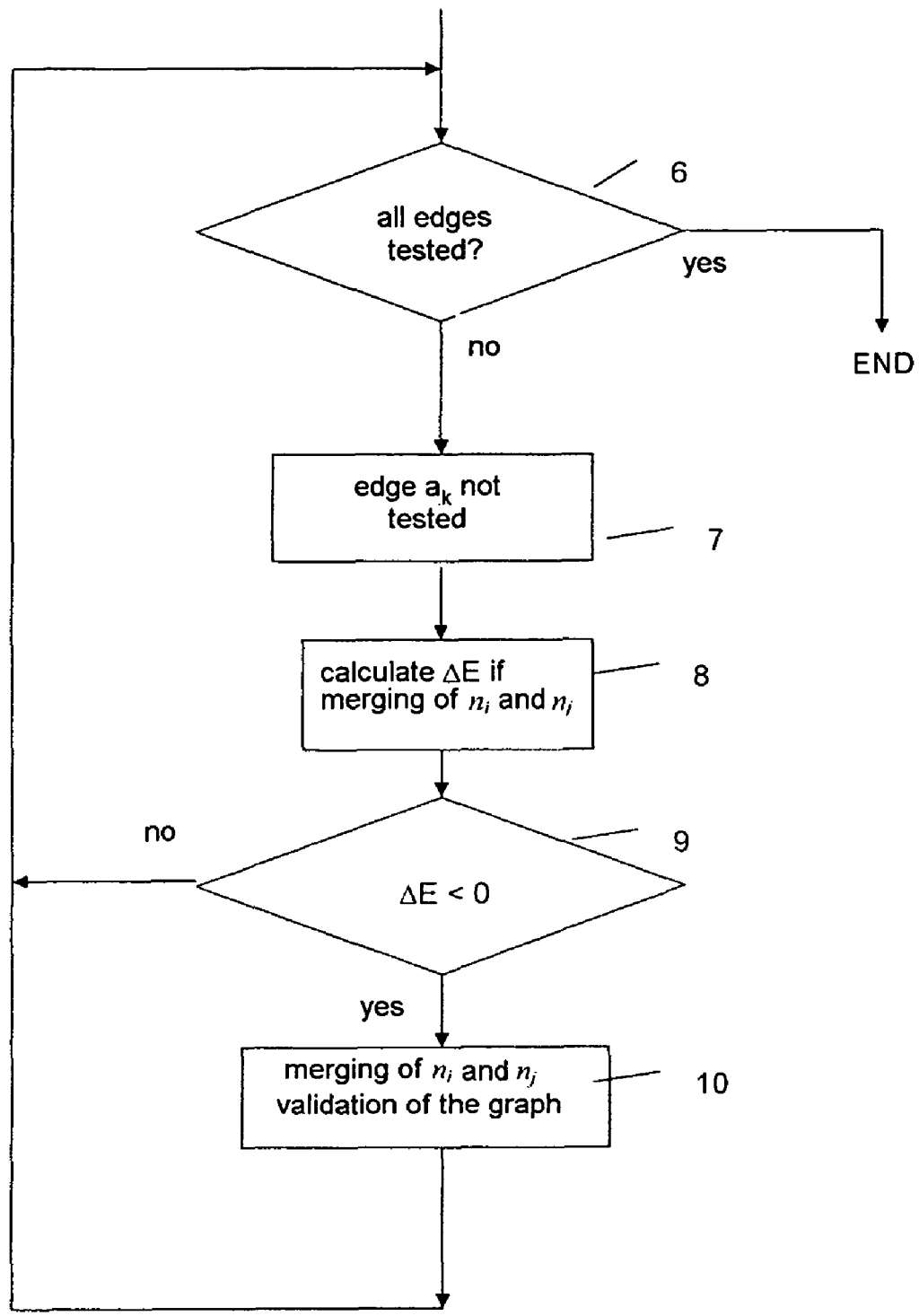
FIG. 3, a flow chart for minimizing the energy of the graph.

The iterative energy reduction process implemented is described in FIG. 3.

The first step referenced 6 verifies whether all the edges of the graph have been tested.

If they have, the iterations are terminated and the shots or key images are clustered into classes of shots, created in tandem with the mergings of the nodes of the graph.

If they have not, the next step is step 7 which takes into account an untested edge $a_k$ of the graph whose ends are the nodes that will be called $n_i$ and $n_j$. The edges are for example selected as a function of their energy value in decreasing order of the values of the associated potential. Indeed a deleted edge of high potential gives rise a priori to a big energy drop.

The next step 8 performs a calculation of the energy of the graph by assuming a merging of nodes $n_i$ and $n_j$. In addition to the potential of the merged node, the potential of the new edges connecting the new node to the set of nodes adjacent to nodes $n_i$ and $n_j$ is taken into account for the calculation of the energy of the new graph. If the energy found is greater than the energy before merging, test performed in step 9, we return to step 6 then to step 7 to process the next edge, should all the edges not have been tested.

Should the energy calculated be less than the energy of the graph before merging, the next step is step 10 which validates the merging of nodes $n_i$ and $n_j$ and the new graph which stems therefrom.

The next step 6 verifies whether all the edges have been tested. This deals with the edges not modified by the merging of the nodes but also new edges calculated during this merge. If they have, the final graph is that validated in the previous step 10.

A simplification consists in using a suboptimal stopping criterion making it possible to avoid the exhaustive traversal of the edges. This simplification consists in stopping the minimization as soon as the potential merging of two nodes gives rise to an increase in the energy. This simplification is rendered acceptable by the intelligent selection of the edges in decreasing order of their value of potential.

The scheme presented is suboptimal overall on account of the irreversible nature of the merging. The switch to minimization of the optimal energy may be envisaged along with high calculation cost.

The choice of the function of energy and potentials that we have just defined allows us to simplify the energy minimization scheme. Specifically, choosing the minimum of the potentials associated with the potential associated with a node originating from the merging of two nodes is less than the sum of the potentials of these two nodes, then the merging of the two nodes necessarily gives rise to a drop in the potential of the neighbouring edges. A local study of the energy variation is therefore sufficient, while ensuring an overall drop in this energy.

The method described makes it possible to obtain an efficacious merging process despite the calculational limitation. The latter relates to the limited possibilities of initial pairings, the number of edges being limited on initialization. It also relates to the utilization of a reduced window on initialization. However, on account of the merging process, shots that are far apart may be clustered together. The potentials take into account the temporal distances and the distances between attributes. They allow merges if the key images, although distant, greatly resemble one another or else, if, although resembling one another averagely, the key images are temporally very close.

The invention claimed is:

1. Method of clustering images of a video sequence consisting of shots and represented by a graph-like structure, a node of the graph representing a shot or a class of shots defined by key images and the nodes being connected by edges, comprising the following iteration:
   selecting an edge $a_k$ connecting nodes $n_i$ and $n_j$
   calculating a potential of node $n_m$,
   merging of the two nodes $n_i$ and $n_j$, as a function of the distances between the attributes of the key images defining the class of shots of node $n_i$ and those of the key images defining the class of shots of node $n_j$ and as a function of the temporal distance of these key images,
   calculating a potential of each edge connecting the merged node to another node of the graph previously connected to nodes $n_i$ or $n_j$, as a function of the distances between the attributes of the key images defining the class of shots of the merged node and those of the key images defining the class of shots of the other node and as a function of the temporal distance between these key images, the new class of shots associated with the merged node comprising the key images of the classes of shots of the merged nodes, and
   merging of the two nodes and validation of the new graph if the energy of this graph, which is the sum of the potentials of the nodes and of the edges, is less than the energy of the graph before merging.

2. Method according to claim 1, wherein the graph is initialized by assigning a node to each shot and in that edges are created from one node to another node if the shots relating to these nodes are separated by a predetermined maximum number T of shots.

3. Method according to claim 1, wherein the value of potential associated with the edges and with the nodes is a respectively decreasing and increasing function of temporal distance.

4. Method according to claim 2, wherein the potential of an edge connecting two nodes $n_i$ and $n_j$ is calculated according to the following equation:

$$V_a(n_i, n_j) = \min_{I_k \in P_i, I_l \in P_j} \left( w_{att} \cdot F_a(K_{att}, \tilde{d}_{att}, d_{att}(I_k, I_l)) + w_T \cdot F_a(K_T, \tilde{d}_T, d_T(I_k, I_l)) \right)$$

and in that the potential of a node born from the merging of two nodes ni and nj is defined by the following function:

$$V_n(n_m = n_i \cup n_j) = \min_{I_k \in P_i, I_l \in P_j} \left( w_{att} \cdot F_n(K_{att}, \tilde{d}_{att}, d_{att}(I_k, I_l)) + w_T \cdot F_n(K_T, \tilde{d}_T, d_T(I_k, I_l)) \right)$$

where:
$P_i$ represents the class of shots associated with node $n_i$ and comprising images $I_k$
$F_a$ is a decreasing function
$F_n$ is an increasing function
$w_{att}$ and $w_T$ represent the weights related to attributes and to time
$d_{att}(I_k, I_l)$ is the distance function associated with the characteristic attributes of the two images
$\tilde{d}_{att}$ represents the mean of the distances between images calculated on the initial graph
$d_T(I_k, I_l)$ is the temporal distance separating the two images
$\tilde{d}_T$ is equal to T which represents the temporal threshold
$K_{att}$ and $K_T$ are two constants.

5. Method according to claim 4, wherein the decreasing function is of the form $$F_a(K, \tilde{d}, d) = \frac{1}{1 + e^{\frac{K}{\tilde{d}}(d-\tilde{d})}}$$

and in that the increasing function is of the form $$F_n(K, \tilde{d}, d) = 1 - \frac{1}{1 + e^{\frac{K}{\tilde{d}}(d-\tilde{d})}}.$$

6. Method according to claim 1, wherein the iterations are stopped as soon as the potential merging of two nodes gives rise to an increase in the energy, the edges being selected, for the calculation of the mergings, in decreasing order of their value of potential.

* * * * *